United States Patent [19]

Krause et al.

[11] Patent Number: 4,823,639

[45] Date of Patent: Apr. 25, 1989

[54] COUNTERSHAFT TRANSMISSION

[75] Inventors: Michael W. Krause, Manito; Willis E. Windish, Pekin, both of Ill.

[73] Assignee: Caterpillar Inc., Peoria, Ill.

[21] Appl. No.: 617,281

[22] Filed: Jun. 4, 1984

[51] Int. Cl.[4] .............................. F16H 3/08
[52] U.S. Cl. ..................... 74/360; 74/331; 74/333; 74/359
[58] Field of Search ................ 74/357, 359, 360, 333

[56] References Cited

U.S. PATENT DOCUMENTS

| | | | |
|---|---|---|---|
| 2,511,039 | 6/1950 | Black et al. | 74/359 |
| 2,825,232 | 3/1958 | Sieving et al. | 74/331 |
| 3,064,488 | 11/1962 | Lee et al. | 74/360 |
| 3,080,767 | 3/1963 | Price, Jr. | 74/360 |
| 3,254,541 | 6/1966 | Schou | 74/360 |
| 3,425,293 | 2/1969 | Krawczyk et al. | 74/360 |
| 3,465,609 | 9/1969 | Fisher et al. | 74/360 |
| 3,710,637 | 1/1973 | Fisher et al. | 74/331 |
| 3,858,455 | 1/1975 | Sisson et al. | 74/360 |
| 3,913,411 | 10/1975 | Jameson | 74/360 |
| 3,913,616 | 10/1975 | Horsch | 137/580 |
| 3,916,714 | 11/1975 | Sisson et al. | 74/331 |
| 3,972,246 | 8/1976 | Link | 74/360 |
| 4,145,935 | 3/1979 | Herlitzer | 74/331 |
| 4,275,607 | 6/1981 | Snoy | 74/15.63 |
| 4,333,358 | 6/1982 | Grattapaglia | 74/359 |
| 4,341,127 | 7/1982 | Stodt | 74/333 |
| 4,392,391 | 7/1983 | Jameson et al. | 74/333 |

FOREIGN PATENT DOCUMENTS 1587699 4/1981 United Kingdom .

Primary Examiner—Dirk Wright
Attorney, Agent, or Firm—Charles E. Lanchantin, Jr.

[57] ABSTRACT

A countershaft transmission provides at least three forward and three reverse speeds and includes a first countershaft having a second gear secured thereto, a third gear rotatable thereon, and a first clutch for connecting the third gear thereto. A second countershaft has a fourth gear secured thereto which is intermeshed with the second gear, a fifth gear rotatable thereon, a sixth gear rotatable thereon, a seventh gear secured thereto, a second clutch for connecting the fifth gear thereto, and a third clutch for connecting the sixth gear thereto. A first gear is adapted to drive one of the side-by-side third and fifth gears, and a third countershaft is disposed elevationally below them. The third countershaft has an eighth gear secured thereto which is intermeshed with the sixth gear. Ninth and tenth gears are rotatable on the third countershaft and are selectively connected thereto by a fourth clutch and a fifth clutch respectively. An input shaft (14) is connected for joint rotation with the first gear (118) and with another gear (258), a further gear (260) is rotatable on the first countershaft (22) and intermeshed with the another gear (258), and another clutch (262) is provided for connecting the further gear (260) to the first countershaft (22). The six rotating clutches are of the interleaved plate type, are hydraulically engaged and mechanically disengaged, and are generally internested between the walls of the housing for compactness. Up to eight forward and four reverse speeds can be obtained with but minor alterations.

4 Claims, 4 Drawing Sheets

| SPEED | CLUTCHES ENGAGED | |
|---|---|---|
| | FORWARD | REVERSE |
| 1 | 152 & 234 | 202 & 234 |
| 2 | 152 & 204 | 202 & 204 |
| 3 | 152 & 230 | 202 & 230 |

COUNTERSHAFT TRANSMISSION

TECHNICAL FIELD

This invention relates generally to a countershaft transmission for a vehicle or the like, and more particularly to a countershaft transmission having a plurality of forward and reverse speeds using constant mesh gearing and a plurality of fluid actuated, rotating clutches of the interleaved multiple plate and disc type.

BACKGROUND ART

Countershaft transmissions having a plurality of speed ratios in each direction of operation are particularly useful in the drive line of vehicles such as earthmoving wheel loaders, rubber tired log skidders, track-type tractors, and other off-highway heavy duty vehicles. Such transmissions are advantageous in that a plurality of rotating clutches and associated gears can be so positioned on the usual parallel shafts as to allow considerable flexibility in adapting them to different vehicle space requirements. A considerable number of speed ratios can also be obtained with but minor changes to the transmission, while permitting a substantial number of similar parts to be used for manufacturing economy.

For example, the following United States countershaft transmission patents are of general interest to the art: U.S. Pat. No. 3,064,488 issued Nov. 20, 1962 to A. L. Lee et al; U.S. Pat. No. 3,080,767 issued Mar. 12, 1963 to S. J. Price, Jr.; U.S. Pat. No. 3,425,293 issued Feb. 4, 1969 to H. S. Krawczyk et al; U.S. Pat. No. 3,465,609 issued Sep. 9, 1969 to J. F. Fisher et al; U.S. Pat. No. 3,710,637 issued Jan. 16, 1973 to J. F. Fisher et al; U.S. Pat. No. 3,858,455 issued Jan. 7, 1975 to R. L. Sisson et al; U.S. Pat. No. 3,913,411 issued Oct. 21, 1975 to J. J. Jameson; and U.S. Pat. No. 4,341,127 issued July 27, 1982 to E. Stodt.

While such countershaft transmissions have a considerable number of desirable features they are deficient in several other respects. One of the major problems with them is that if they are connected to the output member of the engine and/or optional torque converter assembly of the vehicle they require excessive space above the axis of the input shaft. Specifically, in some vehicular applications it would be necessary to raise the floor plates and elevate the entire operator station in order to obtain sufficient clearance above the input shaft's axis to accommodate large diameter components such as a rotating clutch thereat.

Another factor of significance is that some of these available transmissions have an excessive axial length and/or an excessive transverse width so that they cannot fit into the limited space available in a vehicle.

Furthermore, a family of countershaft transmissions is needed which can effectively match various vehicular speed requirements with the elevational drop requirements between the input and output axes. In other words, the transmission should preferably be conveniently convertible to provide one or more additional speed ratios with but minor modification. In addition to such flexibility of construction, and the need to provide both a short drop and large drop capability, the transmission should be able to provide various PTO options at the desired elevational level.

Still further, the construction of many of the prior art countershaft transmissions is excessively complex and costly. Moreover, they have other less noticeable deficiencies such as having excessive bearing speeds and/or clutch plate engagement speeds under certain operating conditions, and these deficiencies reduce the overall service life of the transmissions.

Accordingly, what is needed is a family of economical and compact countershaft transmissions that can provide at least three forward speeds and three reverse speeds, and that can maximize parts commonality and minimize the number of gears, clutches, shafts and bearings that are required. In addition to having a long service life by virtue of designing the bearings and rotating clutches such that they do not function at undesirably high operating speeds, the family of transmissions should be capable of convenient modification so that the individual transmissions can satisfy different drop height requirements as well as different numbers of speeds and speed ratio requirements and thus be adaptable to a wide variety of vehicular applications. In connection with such vehicular use, each of the transmissions should preferably be axially compact and of narrow width while having a minimum elevational clearance above the upper input axis in alignment with the engine output.

DISCLOSURE OF THE INVENTION

The present invention is directed to overcoming one or more of the above problems.

In one aspect of the invention there is provided a countershaft transmission having an input first gear, a first countershaft having a second gear secured thereto and a third gear rotatable thereon, a first clutch for connecting the third gear to the first countershaft, a second countershaft having a fourth gear secured thereto and a fifth gear rotatable thereon, a second clutch for connecting the fifth gear to the second countershaft, and with the first gear being in intermeshing engagement with the third and fifth gears, and the second and fourth gears being in intermeshing engagement. Advantageously, a sixth gear is rotatable on the second countershaft, a third clutch is used for connecting the sixth gear to the second countershaft, and a seventh gear is secured to the second countershaft. A third countershaft has an eighth gear connected thereto which is intermeshed with the sixth gear, a ninth year rotatable thereon which is intermeshed with the fourth gear, a fourth clutch for connecting the ninth gear thereto, a tenth gear rotatable thereon which is intermeshed with the seventh gear, and a fifth clutch for connecting the tenth gear thereto. Moreover, an input shaft having another input gear thereon is connected to the input first gear, a further gear is rotatably mounted on the first countershaft and is intermeshed with the another input gear, and another clutch can be used for connecting the further gear to the first countershaft.

In accordance with another aspect of the invention, a countershaft transmission includes an input first gear disposed on an upper axis, a first countershaft having a second gear secured thereto, a third gear connected to the first gear and being rotatable thereon, and first clutch means for connecting the third gear to the first countershaft. A second countershaft is provided having a fourth gear secured thereto which is connected to the second gear, a fifth gear rotatable thereon which is connected to the first gear, second clutch means for connecting the fifth gear thereto, a sixth gear rotatable thereon, third clutch means for connecting the sixth gear thereto, and a seventh gear secured thereto. An elevationally lower third countershaft is also included which has an eighth gear secured thereto which is connected to the sixth gear, a ninth gear rotatable thereon which is connected to the fourth gear, a tenth gear rotatable thereon which is connected to the seventh gear, fourth clutch means for connecting the ninth gear to the third countershaft, and fifth clutch means for connecting the tenth gear to the third countershaft. Advantageously, another gear is connected to rotate with the input first gear, a further gear is rotationally disposed on the first countershaft and connected to the another gear, and sixth clutch means is provided for connecting the further gear to the first countershaft.

More specifically, the countershaft transmission of the present invention as described above provides two forward speeds and one reverse speed of the second countershaft with the engagement of one of the first three clutches with the input shaft being elevationally disposed directly above the third countershaft, and with the first and second countershafts being disposed in generally side-by-side relation elevationally between the input shaft and the third countershaft. With the selective engagement of one of the second three clutches, three speed ratio paths are available between the second countershaft and the third countershaft. In a modification thereof, an additional high speed clutch and two gears are effective to provide eight forward and four reverse speeds. Moreover, the third countershaft can serve as the output shaft and provide a relatively short drop height or can be geared to an elevationally lower output shaft to provide a greater drop height in order to match various vehicle requirements.

BEST MODE FOR CARRYING OUT THE INVENTION

Figure 1:
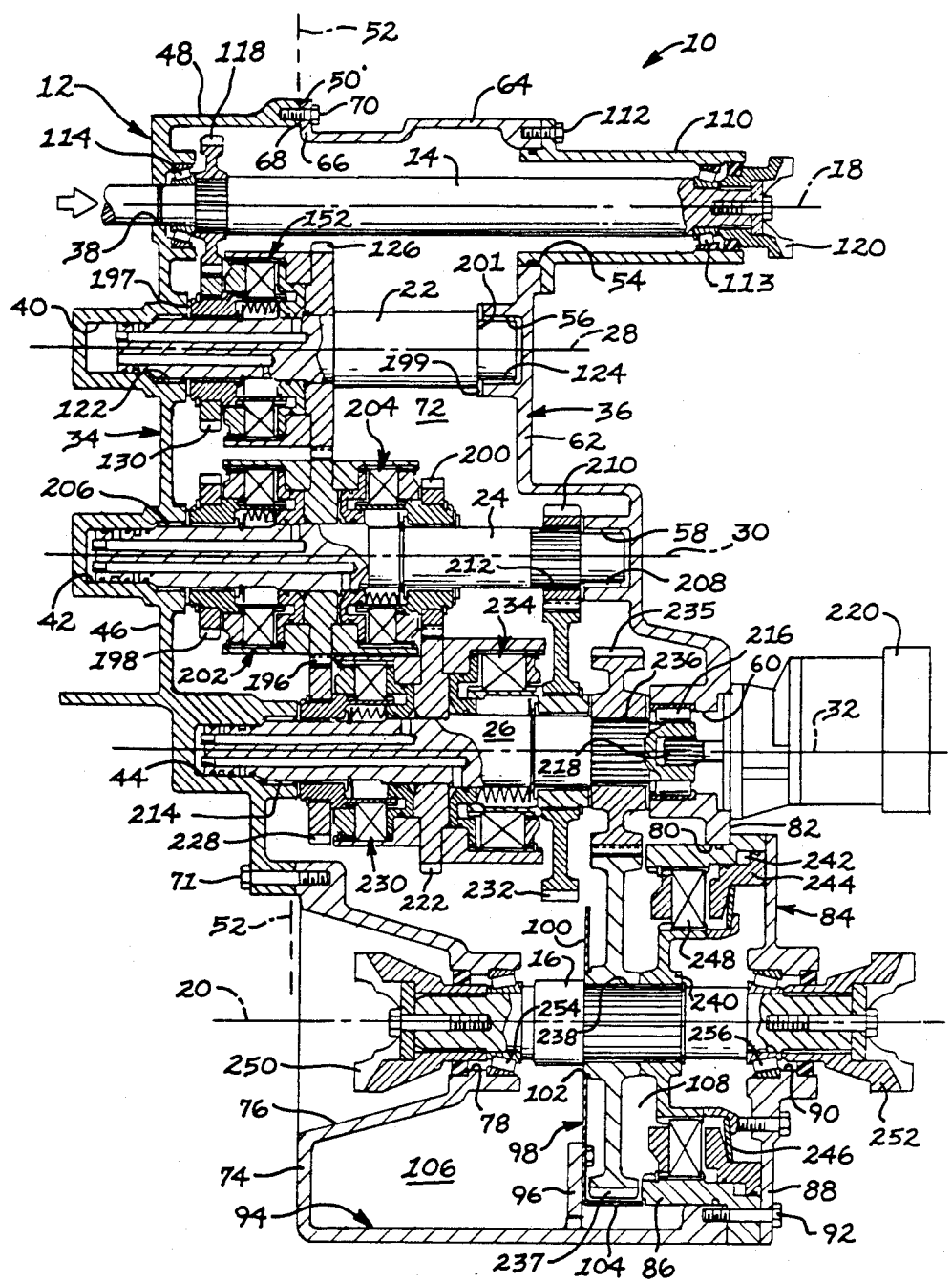
FIG. 1 is a diagrammatic, developed, but substantially side elevational sectionalized view of a three-speed forward and three-speed reverse countershaft transmission constructed in accordance with the present invention.

Referring to FIG. 1, there is shown a countershaft transmission 10 having a housing or drop box 12, and an upper input shaft 14 and a lower output shaft 16 rotatably supported in the housing along an input axis 18 and an output axis 20 respectively. In addition, first, second and third countershafts or intermediate shafts 22, 24 and 26 are rotatably mounted within the housing respectively along axes 28, 30 and 32 which are parallel to each other and to the input and output axes, and are disposed elevationally between the input and output axes as may be noted by reference to FIG. 3.

The housing 12 is advantageously constructed of two major pieces; namely, a front case portion or front cover 34 disposed at the left when viewing FIG. 1 and a rear case portion or main body 36 located at the right. In regard to the general orientation of the countershaft transmission 10 it is contemplated that when it is placed in a vehicle, not shown, the axes of all of the shafts will normally be oriented parallel to the vehicle's longitudinal centerline or along a straight travel direction. Preferably, the input axis 18 will be in coaxial alignment with the output axis of the vehicle's engine, not shown.

A stepped cylindrical bore 38 and a plurality of blind cylindrically shaped stepped pockets 40, 42 and 44 are integrally defined in a front wall 46 of the front case portion 34 along the axes 18, 28, 30 and 32 respectively. The front case portion also defines a peripheral wall 48 that extends rearwardly from the front wall and terminates with a rearwardly facing coupling surface 50 located in a plane 52 normal to the axes of the shafts 14,22,24,26 and 16. In a like manner a cylindrical bore 54, a plurality of blind cylindrically shaped pockets 56 and 58, and a stepped cylindrical bore 60 are integrally defined in a rear wall 62 of the rear case portion 36. An encircling peripheral wall 64 extends forwardly from the rear wall and is provided with a mounting flange 66 which defines a forwardly facing coupling surface 68. A first plurality of threaded fasteners 70 extend through the mounting flange of the rear case portion and are screwthreadably received in the front case portion, and a second plurality of threaded fasteners 71 extend through the front wall 46 of the front case portion 34 and are screwthreadably received in the rear case portion in order to secure them positively together and to define an internal chamber 72.

The bottom of the rear case portion 36 includes a front wall 74 having a conically inwardly tapering integral tube portion 76 defining a stepped cylindrical bore 78 symmetrically arranged along the lower axes 20 of the output shaft 16. The rear case portion also defines a cylindrical bore 80 and a rear face 82 encircling the bore, which are adapted to releasably receive a service brake assembly 84. Specifically, the service brake assembly 84 includes a flanged brake body 86 which pilotably extends forwardly into the bore 80, and a rear cover 88 defining a stepped cylindrical bore 90. A plurality of threaded fasteners 92 extend through the cover and the brake body and are screwthreadably received in the rear case portion to positively secure the parts in place and to define with the rear case portion an oil sump region identified generally by the reference numberal 94 in the lower part of the internal chamber 72. A partition 96 extends upwardly from the bottom of the rear case portion 36 and a sheet metal baffle 98 is releasably secured thereto. This baffle has a flat annular body 100 with a cylindrical opening 102 therethrough and a U-shaped rearwardly extending flange 104 which serve to divide the sump region 94 into a front or main oil reservoir 106 and a slightly elevated rear cavity 108 having an oil level below that of the main reservoir therein during operation of the transmission as will be later explained.

In the embodiment illustrated in FIG. 1, the countershaft transmission 10 has an upper rear, flanged extension tube 110 which is piloted in the bore 54 and releasably secured to the rear wall 62 by a plurality of threaded fasteners 112. A first bearing assembly 113 is disposed in the extension tube for rotatably supporting the rear end of the input shaft 14, and a second bearing assembly 114 is disposed in the stepped bore 38 for rotatably supporting the front end of the input shaft. An input gear or first gear 118 is connected to rotate with the input shaft near the front end thereof, while a power take off (PTO) flange 120 is connected to it at the rear end. This PTO flange is particularly useful for driving auxiliary equipment such as a winch on the vehicle, not shown.

Figure 2:
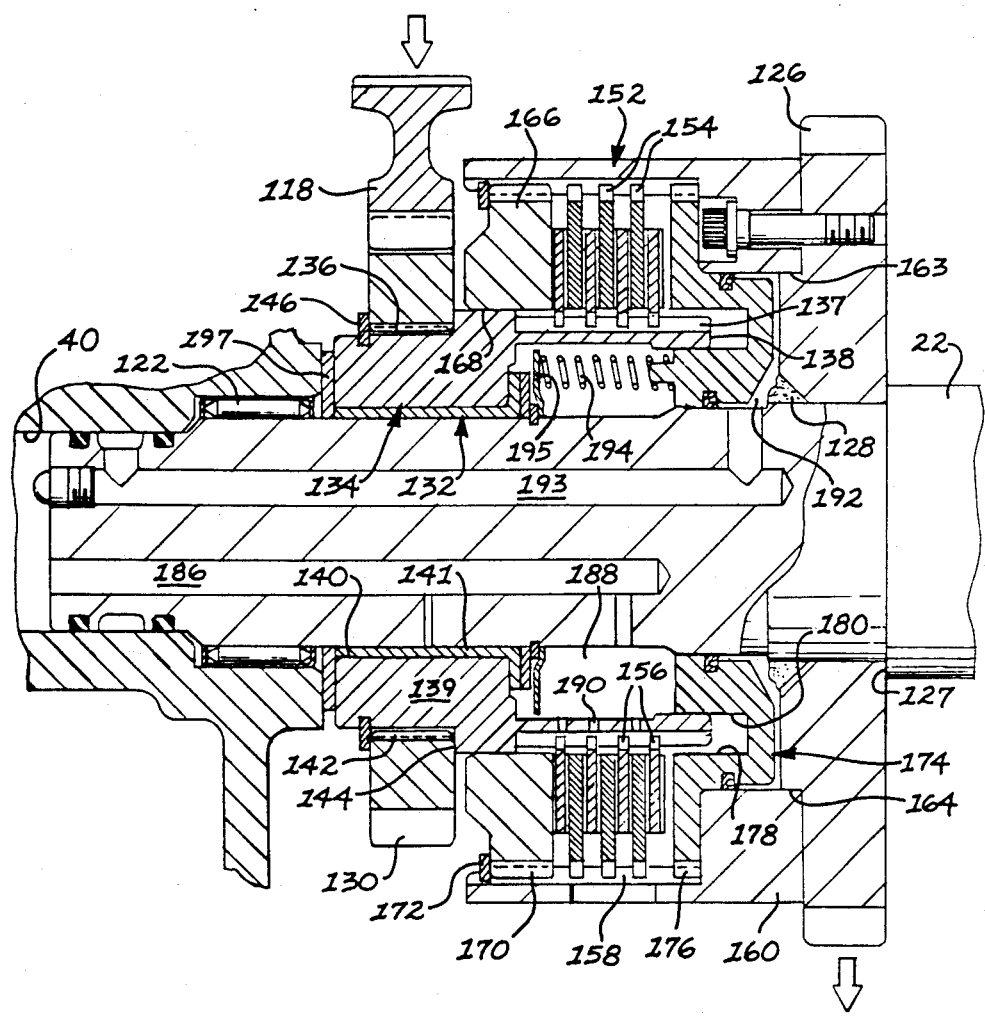
FIG. 2 is a diagrammatic, enlarged cross sectional view of a portion of FIG. 1 showing details of construction of the first rotating clutch by way of example.

As is illustrated best in FIG. 2, the front end of the first countershaft 22 is supported in the stepped pocket 40 of the front case portion 34 by a straight roller or needle bearing assembly 122. And, as shown in FIG. 1, the rear end of the first countershaft is supported in the pocket 56 of the rear case portion 36 by a straight roller or needle bearing assembly 124. A second gear 126 is mounted on the first countershaft in abutment with an annular shoulder 127 formed on the countershaft and is preferably connected for conjoint rotation therewith by an annular fillet weld 128 as is illustrated in FIG. 2. A third gear 130 is freely rotatably mounted on the first countershaft through an intermediate hub assembly 132 and is continually intermeshed with and driven by the input gear 118. The hub assembly 132 has a hub or an annular body 134 defining first and second external splines 136 and 137, a distal end 138, and an enlarged proximal end 139 having an internal bore 140 in which is mounted a flanged bushing or sleeve bearing 141. The third gear 130 has an internal spline 142 which is intermeshingly engaged with the external spline 136 on the hub 134, and the third gear is axially entrapped between a shoulder 144 on the hub at the inner end of the spline and a releasable retaining ring 146.

A first hydraulically engaged and spring disengaged rotating clutch 152 can be selectively engaged to connect the third gear 130 to the first countershaft 22 for conjoint rotation through the second gear 126 in order to achieve a forward mode of operation. More particularly, the first clutch 152 has a first plurality of annular plates 154 and a second plurality of interleaved annular plates or friction discs 156 connected respectively to an internal spline 158 formed on a drum 160 and to the external spline 137 on the hub 134. The drum 160 is secured to the second gear 126 by any suitable means and defines a cylindrical bore 163 within it that is disposed over a cylindrical pilot surface 164 formed on the second gear. An annular reaction plate 166 having a cylindrical bore 168 and an external spline 170 connected to the internal spline 158 of the drum 160 rotates with the first countershaft 22 and is limited in its axial movement by a releasable retaining ring 172.

The first clutch 152 further has an actuating piston 174 having an external spline 176 connected to the internal spline 158 on the drum 160 so that it rotates with the first countershaft 22. An axially outwardly opening pocket 178 having an inner cylindrical surface 180 is defined in the piston in order to telescopically receive the distal end 138 of the hub assembly 132. In this connection a cooling fluid passage 186 is provided in the first countershaft 22 which is in communication with the left or outermost end of the pocket 40. In this way cooling fluid can be directed through the front case portion 34 into the pocket, axially along the passage 186 and radially outwardly into an annular cooling fluid chamber 188. A plurality of radially oriented passages 190 are formed in the distal end 138 of the hub assembly 132 for controllably directing the cooling fluid radially outwardly to the interleaved plates 154 and discs 156.

An actuating chamber 192 is defined between the piston 174, the first countershaft 22, the drum 160, and the second gear 126, and can be supplied with pressurized fluid via a passage 193 in a conventional manner. With such pressurization the piston is urged to the left when viewing FIG. 2 so that it presses the interleaved plates 154 and discs 156 axially together and against the reaction plate 166. Thus the third gear 130 is caused to rotate with the first countershaft. A plurality of compression springs 194 acting against annular seat means 195 on the first countershaft serve to positively disengage the first clutch 152 by moving the piston to the right when viewing FIG. 2 when pressure is reduced in the actuating chamber.

Any forces tending to urge either the first countershaft 22 or the hub assembly 132 forwardly or to the left when viewing FIG. 2 will be transmitted to the housing 12 substantially independently of the straight roller bearing assemblies 122,124 through a front thrust washer 197 located between the housing and hub assembly. Any forces tending to move these same elements to the right when viewing FIG. 1 will be transmitted to the housing through a rear thrust washer 199 located between the housing and a shoulder 201 formed on the first countershaft.

Turning now to the second countershaft 24 shown in FIG. 1, it can be noted to have a fourth gear 196 secured thereto which is continually meshing with the second gear 126 so that the second countershaft always rotates in a direction opposite to the first countershaft 22. Fifth and sixth gears 198 and 200 are freely rotatably mounted on the second countershaft, and with the fifth gear 198 being continually intermeshed with and driven by the input gear 118 as can best be visualized by reference to FIG. 3. A second clutch 202 is used to connect the fifth gear 198 to the second countershaft for a reverse drive, and a third clutch 204 is used to connect the sixth gear 200 to the second countershaft for a second speed condition. Although illustrated only diagrammatically in FIG. 1, the clutches 202 and 204 are of the multiple plate and disc type and are similar in construction to the first speed clutch 152 described immediately above as can be appreciated by reference to the drawings. It can be further seen that the second countershaft 24 is rotatably supported in the pockets 42 and 58 through straight roller or needle bearing assemblies 206 and 208 respectively, and that a seventh gear 210 is releasably connected for conjoint rotation therewith as by a spline joint 212.

The third countershaft 26 is advantageously displaced axially rearwardly a preselected distance with respect to the first and second countershafts 22 and 24 for optimized compactness, and is rotatably mounted in the front stepped pocket 44 via a straight roller or needle bearing assembly 214. The rear portion of the third countershaft is supported in a somewhat larger capacity straight roller bearing assembly 216 in the stepped bore 60, and is releasably connected to a splined steering pump drive shaft 218. A steering pump 220 is releasably secured to the rear case portion 36 by any suitable means and is continually driven by the third countershaft via the drive shaft.

An eighth gear 222 is preferably weldably secured to the third countershaft 26 in the same manner as the gears 126 and 196 are secured to their respective countershafts 22 and 24. A ninth gear 228 is mounted for free rotation on the third countershaft 26, and is selectively connected thereto by a fourth clutch 230 which can provide a third speed condition. A tenth gear 232 is also freely mounted on the third countershaft, and is connectable thereto by hydraulic actuation of a fifth clutch 234 which can provide a first speed condition. Because of the axially rearwardly displaced, but nested relationship of the third countershaft 26 to the second countershaft 24, the gears 228, 222 and 232 are disposed in aligned and continually intermeshing engagement with the gears 196, 200 and 210 respectively. The fourth and fifth clutches 230 and 234 are preferably like the first clutch 152 described in detail earlier.

While it may be desirable to use the third countershaft 26 as the output shaft in those vehicles having less elevational distance between the input and output axes, the embodiment of FIG. 1 has an eleventh gear 235 that is releasably secured to the third countershaft by a spline joint 236. This eleventh gear serves to drive a relatively large diameter twelfth gear 237 conjointly coupled to the output shaft 16 by a shaft spline 238. A hub 240 forming part of the service brake assembly 84 is connected to the same shaft spline, so that when the service brake assembly is actuated by release of pressure fluid from a chamber 242 an actuating piston 244 will be moved leftwardly when viewing FIG. 1 by a Belleville compression spring 246. This will axially compress a plurality of alternately interleaved plates and discs 248 together in a well known manner, as is only diagrammatically indicated, so that the hub 240 can be frictionally connected to the rear case portion 36. This brakes the output shaft 16 and the front and rear wheels, not shown, which can be respectively driven through a front connecting flange 250 and a rear connecting flange 252. Advantageously, the flange 250 is nestably received within the tube portion 76 of the housing 12 and this permits a compact connection with the associated axle of the vehicle, not shown.

The output shaft 16 is rotatably supported by a pair of opposed tapered bearing assemblies 254 and 256 in the stepped bores 78 and 90 respectively, and when it rotates the twelfth gear 237 is disposed in relatively close proximity to the flange 104 of the baffle 98. Accordingly, the teeth of the twelfth gear urge cooling fluid upwardly and forwardly over the edges of the U-shaped flange 104 of the baffle 98 into the reservoir 106 in order to decrease the fluid level in the cavity 108. In this regard it is to be noted that the flange 104 relatively tightly encircles or conforms with the lower periphery of the flanged brake body 86 and provides minimal clearance therebetween so that only a small amount of fluid from the reservoir can enter the cavity 108 from the reservoir 106 because of the reservoir's elevationally greater fluid level. This minimizes horsepower losses in cavity 108 that would otherwise occur due to fluid churning and aeration problems.

INDUSTRIAL APPLICABILITY

Figure 5:
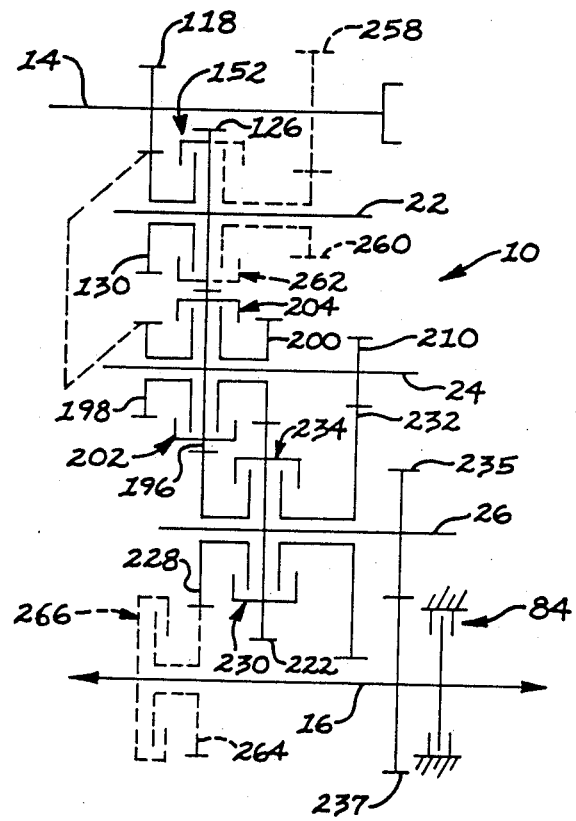
FIG. 5 is a diagrammatic, single line drawing of the major elements of the countershaft transmission of FIG. 1 in solid lines, and illustrating two alternate embodiments in broken lines including additional components for respectively providing six forward and three reverse speeds and eight forward and four reverse speeds.

In operation, the input shaft 14 of the countershaft transmission 10 shown in FIGS. 1 and 5 can be driven by the engine of the vehicle and/or by the output member of an optional torque converter mechanism as is well known in the art, although not illustrated. This will simultaneously drive the third gear 130 and the fifth gear 198 because the input gear 118 on the input shaft is intermeshed with both of them. Assuming that a first forward speed is desired, the operator so controls the vehicle as to cause the first clutch 152 and fifth clutch 234 to be hydraulically actuated so as to engage the interleaved plates thereof together. This respectively connects the third gear 130 for conjoint rotation with the first countershaft 22, and the tenth gear 232 for conjoint rotation with the third countershaft 26. Accordingly, the output shaft 16 is driven at a relatively low speed ratio by way of gear pairs 118-130, 126-196, 210-232 and 235-237. Note is made that countershafts 22 and 24 always rotate in opposite directions because the gears 126 and 196 rotate respectively therewith and yet are continually intermeshed. Also, since the fifth clutch 234 is subject to greater torque loading due to its higher speed reduction ratio it is preferably larger in diameter than the other rotating clutches 152, 202, 204 and 230, which can advantageously be of the same lesser diameter for parts commonality.

Figures 3, 4:
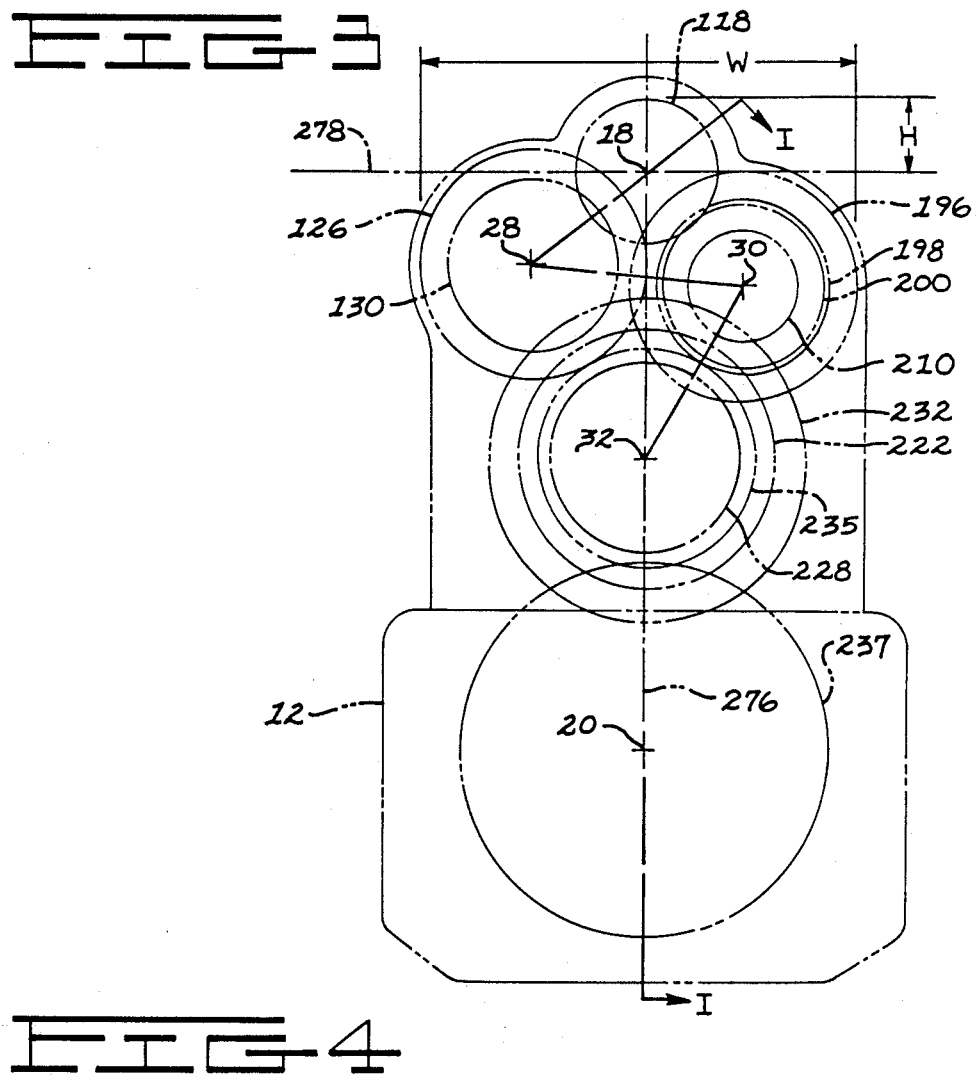
FIG. 3 is a diagrammatic, end elevational view of the countershaft transmission of FIG. 1 showing the relationship of the various shaft axes and the constantly meshing gearing associated therewith and the cutting plane of developed FIG. 1.
FIG. 4 is a speed chart for the transmission of FIG. 1 showing the clutches which are engaged in each of the forward and reverse speeds.

As indicated by the speed chart of FIG. 4, it is only necessary to disengage the fifth clutch 234 and to engage the third clutch 204 in order to shift the transmission 10 from first to second forward speed. In this mode, the speed reduction ratio is reduced and the output shaft is driven at a higher speed by way of gear pairs 118-130, 126-196, 200-222, and 235-237.

In order to shift from second to third speed forward, the third clutch 204 is disengaged and the fourth clutch 230 is engaged. Hence, only one clutch need be engaged from first to second, or from second to third which is advantageous from both the torque loading and control standpoints. In third gear forward, the drive is by way of gear pairs 118-130, 126-196, the gear 228 driven by the gear 196 and to the third countershaft 26, and by the gear pair 235-237.

In first reverse, as shown by the chart of FIG. 4, the low speed clutch 234 is engaged as it is in first forward. However, in the reverse mode of operation the second clutch 202 is always engaged. Torque is thereby transmitted to the output shaft 16 via gear pairs 118-198, 210-232, and 235-237.

To achieve second reverse, the low speed clutch 234 is disengaged and the third clutch 204 is engaged. Output shaft 16 is driven by gear pairs 118-198, 200-222, and 235-237.

Lastly, to shift to third speed reverse, the third clutch 204 is disengaged while the fourth clutch 230 is engaged. Again, as in forward, it is only necessary to engage a single clutch to change reverse speeds. Torque is transmitted in third speed reverse through gear pairs 118-198 and 196-228 to the third countershaft 26, and from there to gear pairs 235-237.

Referring now to FIG. 5, and to a first alternate embodiment of the countershaft transmission 10 which includes some additional components as is diagrammatically shown by the broken lines at the upper right portion thereof. Specifically, a thirteenth gear 258 can be secured to the input shaft 14 rearwardly of the first gear 118, a fourteenth gear 260 can be rotatably mounted on the first countershaft 22, and a sixth or splitter clutch 262 can be used to selectively connect the fourteenth gear 260 for conjoint rotation with the first countershaft. This will enable the second gear 126 to be driven at either one of two speeds as determined by the ratio of gear pair 118-130 or gear pair 258-260. With such construction the countershaft transmission 10 can provide from four to six forward speeds in addition to the three reverse speeds discussed heretofore.

A second alternate embodiment of the countershaft transmission 10 includes some additional members over those described with respect to the first alternate embodiment. Such new members are illustrated in broken lines at the lower left portion of FIG. 5 and include a fifteenth gear 264 freely rotatably mounted on the output shaft 16 and continually intermeshed with the ninth gear 228 on the third countershaft 26. A seventh clutch or high speed clutch 266 can then be used to selectively connect the fifteenth gear 264 for conjoint rotation with the output shaft. This is effective to provide up to eight forward speeds and four reverse speeds. For example, the first clutch 152 can be used progessively with the fifth clutch 234, the third clutch 204, the fourth clutch 230, and the seventh clutch 266 to provide the first to the fourth forward speed ratios. Then the sixth clutch 262 can be used progressively with the same clutches 234, 204, 230 and 266 to provide the fifth through eighth forward speed ratios. In reverse the highest speed would be provided by the engagement of the reverse clutch 202 with the seventh clutch 266.

Figure 6:
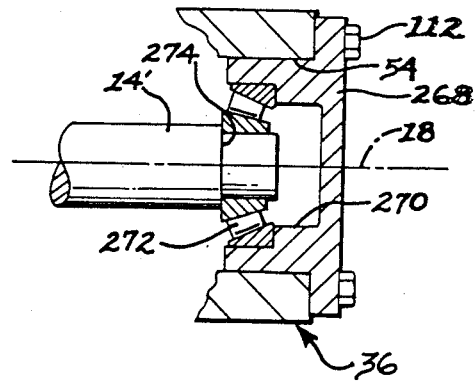
FIG. 6 is a fragmentary, sectional view showing another alternate embodiment of the countershaft transmission of FIG. 1 involving a foreshortened construction of the upper input shaft.

Another alternate embodiment is shown by the auxiliary view of FIG. 6, wherein the input shaft 14' is foreshortened in comparison with the input shaft 14 where no power take-off is required along the upper axis 18. In this instance, an end cap 268 is pilotably disposed in the bore 54 and releasably secured to the rear case portion 36 by the fasteners 112. A stepped pocket 270 is defined in the end cap and a tapered roller bearing assembly 272 is seated in the pocket and against a shoulder 274 formed on the input shaft 14' for rotatably supporting the rear end of the input shaft 14' in paired thrust absorbing relation to the facing tapered roller bearing assembly 114 shown in FIG. 1. With such alternative construction, all of the shafts 14', 22 and 24 would be relatively short and define a particularly axially compact construction at the upper portion of the transmission 10.

As can be visualized with reference to FIG. 3, an upright or vertical plane 276 preferably passes through the input axis 18, the axis 32 of the third countershaft 26, and the axis 20 of the output shaft 16. The axes 28 and 30 of the first and second countershafts 22 and 24 respectively are substantially symmetrically arranged on the opposite sides of the vertical plane and elevationally between the upper axis 18 and the intermediate axis 32 of the third countershaft 26. The third countershaft could clearly serve as the transmission output, if desired, by merely removing the steering pump 220 from the location illustrated in FIG. 1. Moreover, the axes 28 and 30 are so located relative to a horizontal plane 278 passing through the input axis 18 that the relatively large diameter gears 126 and 196 do not extend to any substantial degree above such horizontal plane. Since the input gear 118 is desirably relatively small in diameter, the instant transmission requires only a minimal vertical clearance height "H" above the input axis 18 as is indicated in FIG. 3. This is a significant feature in many vehicle applications. Note that the overall width "W" of the gears 126 and 196 as indicated in the drawing is also minimal. Still further, the overall drop can be tailored from the minimum distance illustrated between axes 18 and 32 to a maximum distance corresponding to the distance between axes 18 and 20. And, the overall speed reduction ratios can also be conveniently changed by modifying only the output gears 235 and 237 and/or by modifying the input gears 118, 130 and 198.

In view of the foregoing, it is apparent that the countershaft transmission 10 is simple and rugged in its construction, and is of light weight. Moreover, it is adaptable to a large number of vehicular applications since the output shaft drop height from the input centerline can be conveniently varied and the number of speed ratios varied as explained heretofore. The first and second clutches 152 and 202 are laterally in longitudinal alignment, and the third and fourth clutches 204 and 230 are elevationally in longitudinal alignment in order to conserve space. Furthermore, the longitudinally offset and elevationally nested nature of the second and third clutches 202 and 204 on the second countershaft 24 and the fourth and fifth clutches 230 and 234 on the third countershaft 26 is particularly advantageous from an overall compactness standpoint. Also, the construction of the region of the input shaft 14 minimizes transmission height and provides a highly desirable PTO location.

Another feature of the countershaft transmission 10 is that the physical location of the first or low speed providing clutch 234 is such as to minimize high speed rotation of other elements of the transmission under normal operating conditions. In certain prior art transmissions it is understood that bearing speeds considerably above about 5,000 rpm, for example 8,000 rpm, are experienced by the inactive gears. Whereas in the countershaft transmission 10 the bearing speeds of the inactive gears during roading of the vehicle are generally limited to a maximum of about 5,000 rpm with an assumed speed of 2400 rpm for the input shaft 14. Thus the bearings will live substantially longer and/or can be of somewhat less sophisticated and more economical design.

Other aspects, objects and advantages of this invention can be obtained from a study of the drawings, the disclosure and the appended claims.

We claim:

1. In a countershaft transmission of the type having an input first gear, a first countershaft having a second gear connected for joint rotation therewith and a third gear mounted for free rotation thereon, a first clutch for selectively connecting the third gear to the first countershaft, a second countershaft having a fourth gear connected for joint rotation therewith and a fifth gear mounted for free rotation thereon, the second and fourth gears being intermeshed, and a second clutch for selectively connecting the fifth gear to the second countershaft, the improvement comprising:

a sixth gear mounted for free rotation on the second countershaft;

a third clutch for selectively connecting the sixth gear to the second countershaft;

a seventh gear mounted for joint rotation with the second countershaft;

a third countershaft and an eighth gear connected for joint rotation therewith and being intermeshed with the sixth gear;

a ninth gear mounted for free rotation on the third countershaft and being intermeshed with the fourth gear;

a fourth clutch for selectively connecting the ninth gear to the third countershaft;

a tenth gear mounted for free rotation on the third countershaft and being intermeshed with the seventh gear;

a fifth clutch for selectively connecting the tenth gear to the third countershaft;

an input shaft connected for joint rotation with the first gear;

another gear connected for joint rotation with the input shaft;

a further gear mounted for free rotation on the first countershaft and directly intermeshing with the another gear;

another clutch for selectively connecting the further gear to the first countershaft;

the input first gear being drivingly intermeshed with the third gear and the fifth gear such that selective actuation of one of the first clutch and the another clutch provides two forward modes and selective actuation of the second clutch provides a reverse mode of operation of the second countershaft; and selective actuation of one of the third, fourth and fifth clutches provides a plurality of output speeds of the third countershaft with simultaneous actuation of one of the first clutch, the second clutch and the another clutch.

2. The countershaft transmission of claim 1 including an output shaft, an additional gear mounted for free rotation on the output shaft and intermeshed with the ninth gear, and an additional clutch for selectively connecting the additional gear to the output shaft.

3. A countershaft transmission comprising:

an input first gear disposed on an upper first axis;

a first countershaft having a second axis, a second gear secured thereto, and a third gear rotatable thereon and intermeshingly connected directly to the first gear;

first clutch means for connecting the third gear to the fist countershaft;

a second countershaft having a third axis, a fourth gear secured thereto and connected to the second gear, a fifth gear rotatable thereon and intermeshingly connected directly to the first gear, a sixth gear rotatable thereon, and a seventh gear secured thereto;

second clutch means for connecting the fifth gear to the second countershaft;

third clutch means for connecting the sixth gear to the second countershaft;

a third countershaft having a lower fourth axis, an eighth gear secured thereto and connected to the sixth gear, a ninth gear rotatable thereon and connected to the fourth gear, and a tenth gear rotatable thereon and connected to the seventh gear;

fourth clutch means for connecting the ninth gear to the third countershaft;

fifth clutch means for connecting the tenth gear to the third countershaft;

another gear secured to rotate with the first gear on the first axis;

a further gear rotatable on the first countershaft and directly intermeshing with the another gear; and sixth clutch means for connecting the further gear with the first countershaft, and wherein selective actuation of one of the first clutch means and the sixth clutch means provides two forward modes and selective actuation of the second clutch means provides a reverse mode of operation of the second countershaft, and selective actuation of one of the third, fourth and fifth clutch means provides a plurality of output speeds of the third countershaft when used therewith.

4. The countershaft transmission of claim 3 including an output shaft, an additional gear intermeshed with the ninth gear and being mounted for free rotation on the output shaft, and additional clutch means for selectively connecting the additional gear to the output shaft.

* * * * *